United States Patent [19]

Fukuda et al.

[11] 4,001,040

[45] Jan. 4, 1977

[54] FUEL CELL

[75] Inventors: Masataro Fukuda, Toyonaka; Tsutomu Iwaki, Kyoto; Yoshihiro Kobayashi, Neyagawa, all of Japan

[73] Assignee: Matsushita Electric Industrial Company Ltd., Osaka, Japan

[22] Filed: Nov. 19, 1973

[21] Appl. No.: 417,189

Related U.S. Application Data

[63] Continuation of Ser. No. 174,041, Aug. 23, 1971, abandoned.

[30] Foreign Application Priority Data

| Sept. 2, 1970 | Japan | 45-77670 |
| Sept. 2, 1970 | Japan | 45-77677 |
| Sept. 4, 1970 | Japan | 45-78093 |
| Oct. 16, 1970 | Japan | 45-88575 |

[52] U.S. Cl. .................................. 429/15; 429/34
[51] Int. Cl.² .................... H01M 4/00; H01M 8/04
[58] Field of Search ............. 136/86 E, 86 A, 86 R

[56] References Cited

UNITED STATES PATENTS

| 2,925,454 | 2/1960 | Justi et al. | 136/86 E |
| 3,227,585 | 1/1966 | Langford et al. | 136/86 E |
| 3,382,103 | 5/1968 | Smith | 136/86 E |
| 3,410,729 | 11/1968 | Manion | 136/86 E |
| 3,553,024 | 1/1971 | Fishman | 136/86 D |
| 3,811,949 | 5/1974 | Jung | 136/86 E |

*Primary Examiner*—John H. Mack
*Assistant Examiner*—H. A. Feeley
*Attorney, Agent, or Firm*—Stevens, Davis, Miller & Mosher

[57] ABSTRACT

A fuel cell is constructed in such a manner that a porous film which is electrolyte-resistant and inactive to fuel is allowed to adhere to one surface of a fuel electrode and an electrolyte containing hydrazine fuel supplied to the cell and passing through said porous film and fuel electrode reaches the side of an oxidation electrode. In such fuel cell, self-decomposition of fuel due to direct contact with the fuel electrode occurs in a small degree and utilization efficiency of fuel is high. Furthermore, such fuel cell can be operated with an electrolyte containing fuel in a high concentration.

12 Claims, 5 Drawing Figures

FUEL CELL

This is a continuation, of application Ser. No. 174,041, filed Aug. 23, 1971, now abandoned.

The present invention relates to a fuel cell in which an electrochemical reaction is carried out by dissolving hydrazine in an electrolyte such as an aqueous solution of caustic alkali.

A fuel cell which is operated by supplying thereto an electrolyte into which hydrazine is incorporated has the advantages that the fuel can be easily and safely handled.

However, hydrazine is a fuel of high activity. Therefore, when concentration of fuel in electrolyte is increased, the fuel tends to chemically decompose only by contact with fuel electrode. Thus, there has been a defect that utilization efficiency of fuel for actual electrochemical reactions is decreased.

Therefore, conventionally, the concentration of fuel in electrolyte has been severely controlled to prevent reduction of utilization efficiency of fuel. However, in order to severely control the concentration of fuel, it is required that apparatuses for detection of the concentration and for supplying fuel to electrolyte be operated in a high accuracy. Thus, more complicated mechanism has been required. Moreover, because of reduction of fuel concentration in electrolyte, it becomes necessary to increase the amount of mixture of fuel and electrolyte supplied to the cell. As the result, a large driving apparatus is required for supplying the solution and a high power is also required therefor. Thus, in case of providing said power from the cell itself, the efficiency of the whole cell system has been lowered.

In order to overcome the defects as mentioned above, it has been proposed to provide a film capable of permeating a gas, but uncapable of permeating a liquid on a surface of fuel electrode which does not face oxidation electrode and to diffuse gaseous hydrazine into the fuel electrode through said film to carry out electrochemical reaction. However, it is difficult to obtain a film which can completely prevent leakage of electrolyte from fuel electrode side and which can permeate only a gas. Furthermore, in such conventional cell, only vaporized fuel is reacted and hence discharging at a high current density can be carried out only at a high temperature as compared with the usual cell where fuel in liquid state directly contacts with fuel electrode.

The object of the present invention is to provide a fuel cell capable of preventing decomposition of fuel and having a high utilization efficiency of fuel.

Further object of the present invention is to provide a high efficiency and easily handling fuel cell which requires small power for driving apparatus for supplying solution by making possible to supply to cell an electrolyte with which a high concentration fuel is mixed and which requires no complicated mechanism such as apparatus for severely controlling concentration of fuel.

The fuel cell of the present invention comprises an oxidation electrode of air or oxygen as an active material, a fuel electrode of hydrazine as an active material, an electrolyte comprising an aqueous solution of caustic alkali in which hydrazine is dissolved and a jar which is divided into first and second chambers by said fuel electrode, in the first chamber the oxidation electrode being provided opposing the fuel electrode and in the second chamber the electrolyte in which hydrazine is dissolved being supplied. An electrolyte resisting micro-porous film is allowed to adhere to the surface of the fuel electrode which faces said second chamber. The electrolyte which contains fuel is supplied to the second chamber and the fuel passes through said microporous film and fuel electrode to reach the first chamber.

According to the present invention, fuel diffuses through a film which adheres to a fuel electrode and reaches the fuel electrode to cause electrochemical reaction. Therefore, even if fuel concentration in the electrolyte is high, the fuel which has passed through the film as mentioned above directly contacts with the fuel electrode. Therefore, the decomposition rate of fuel is low as in the case of using an electrolyte containing fuel in a low concentration. Thus, utilization efficiency of fuel can be increased.

Said film which is allowed to adhere to fuel electrode is required to have the following characteristics, that is, (1) it should be micro-porous so that it can cause the electrolyte containing fuel to diffuse into the fuel electrode at a suitable speed, (2) it should be inactive to the fuel (3) it should be electrolyte-resistant, and (4) is should adhere to the fuel electrode. Most preferably, said film is made from a mixture of powders of nickel oxide, iron oxide, graphite, aluminum oxide, magnesium oxide, etc. which is alkali resistant and is inactive to fuel and a binder such as fluorine resin, polystyrene, or polyvinyl chloride. Only said binder of synthetic resin can be used to cause adhesion of the film to fuel electrode and then to form suitable pores in the resultant film. However, with use of only the synthetic resin, it is somewhat difficult to control the pores through which fuel is diffused. On the other hand, when the film is produced from powders of materials which is inactive to fuel as referred to above and said binder, said inactive powders serve for control of the pores and thus, very effective film is obtained.

Other characteristic of the present invention will become apparent from the drawing and Examples given hereinafter.

EXAMPLE 1

This Example illustrates an application of the present invention to an air-hydrazine fuel cell.

As an air electrode, one which has been used in the usual fuel cell can be employed as it is.

A porous substrate plate obtained by sintering carbonyl nickel powders which contained a small amount of active carbon and in which a nickel screen was placed at the center thereof was used and silver was added thereto as a catalyst. Then, it was impregnated with an emulsion of polytetrafluoroethylene and heat treated in an inert gas atmosphere at a temperature of 330°–370° C for about 1 hour to cause strong fused-adhesion of said polytetrafluoroethylene to the substrate plate. Thus, water proofing property was imparted thereto. A porous polyfluorocarbon thin film of about 0.3 mm thickness was allowed to adhere to the surface of said electrode which contact with air with a pressure of 80–180 kg/cm$^2$. Furthermore, a porous thin layer of a mixture comprising nickel oxide powders and polyfluorocarbon was formed on the surface of said electrode which contacted with electrolyte. This layer was effective for preventing decomposition of fuel in the electrolyte due to contact with catalyst of air electrode.

As the fuel electrode body, one which has usually been used can be employed as it is. One example thereof is such that comprises a porous substrate plate which is obtained by sintering carbonyl nickel powders where a nickel screen is placed at the center thereof and to which a catalyst is added.

On one surface of said substrate plate, a porous thin film was formed from iron oxide powders which do not react with fuel and electrolyte and fluorine resin (polyfluorocarbon) as a binder. The procedure for formation of the film was as follows:

A mixture of 20 parts by weight of polytetrafluoroethylene powders having an average particle size of about 1$\mu$ and 80 parts by weight of iron oxide powders of an average particle size of about 0.8$\mu$ is suspended in an alcohol, e.g., methyl alcohol. The resulting suspension was applied to one surface of said sintered body and this sintered body was predried. Thereafter, it was heat treated at 330°–370° C in an inert atmosphere to form a porous thin film which adhered to the nickel sintered body. The amount of said thin film was preferably about 10–40 mg/cm$^2$.

Then, said nickel sintered body was impregnated with a mixture solution of nickel salt and copper salt and said salts are reduced to form Cu-Ni catalyst within pores of the nickel sintered body. Then, palladium was added thereto by electroless plating to obtain a fuel electrode.

Preferably, the binder used in formation of the thin film of fuel electrode is polyfluorocarbon such as polytetrafluoroethylene, copolymer of tetrafluoroethylene and hexafluoropropylene.

Figure 1:
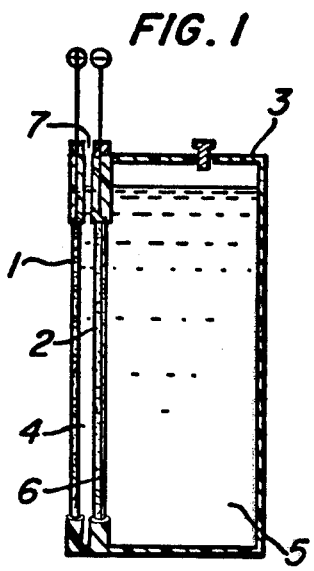
FIG. 1 shows a longitudinal section of one embodiment of the air-hydrazine fuel cell of the present invention.

FIG. 1 shows a unit cell using one air electrode and one fuel electrode mentioned above.

Figure 2:
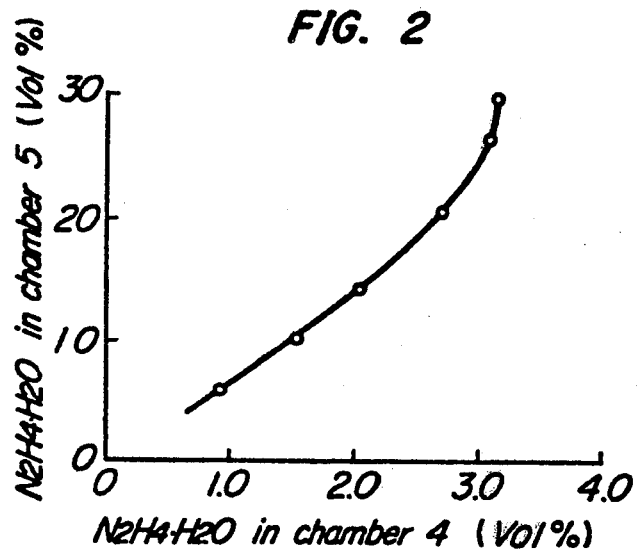
FIG. 2 is a graph which shows a relation between hydrazine hydrate content in electrolyte in the first chamber and that in the second chamber.
Figure 3:
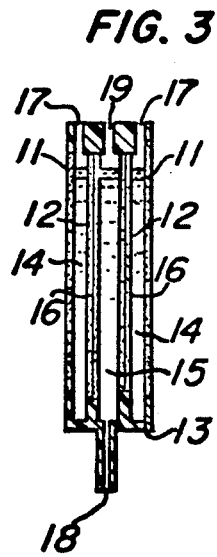
FIG. 3 shows a longitudinal section of another embodiment of the present fuel cell.

In FIGS. 1, 1, 2 and 3 indicate air electrode, fuel electrode and plastic jar, respectively. The inside of the jar is divided into first chamber 4 and second chamber 5 by fuel electrode 2. Porous thin film 6 is formed on the surface of the fuel electrode 2 which faces the second chamber 5. 7 indicates an opening for discharging gas. A mixed solution of a fuel and an electrolyte is introduced into the second chamber 5 and the solution which has passed through the porous thin film 6 and the fuel electrode 2 enters chamber 4. As said solution, a mixed solution of hydrazine hydrate and an aqueous solution of caustic potash having a specific gravity of 1.30 is used and the composition at initiation of discharge is such that the former : later is 70:30 in volumeric ratio.

When said cell was discharged at a current density of 50 mA/cm$^2$ at room temperature, a terminal voltage was 0.84–0.80 V and utilization efficiency of fuel was 60–70%.

FIG. 2 shows volumeric percentage of hydrazine hydrate contained in the electrolyte in the cell when discharged at a current density of 50 mA/cm$^2$. The ordinate and abscissa in FIG. 2 show contents of hydrazine hydrate in the solution in chambers 5 and 4, respectively.

According to the construction of the cell of the present invention, even when hydrazine which is an active fuel is added to electrolyte in a high concentration, since feeding of fuel to fuel electrode body is carried out through a porous thin film layer which is provided in adherence to fuel electrode body and which is inactive to fuel and electrolyte resistant, diffusion of fuel is controlled and concentration of fuel fed to the fuel electrode body is diluted to such extent as is suitable for reaction. Furthermore, amount of fuel which reaches the surface of air electrode which contacts with electrolyte becomes extremely small and the fuel gives substantially no bad effect on potential of air electrode. Therefore, even when fuel of high concentration is used, discharge voltage and utilization efficiency of fuel can be kept at high degree.

In the fuel cell of the present invention, extremely active fuel in a large amount can be mixed with electrolyte. Therefore, in case of a fuel cell in which all of electrolyte and fuel are maintained in a jar as shown in FIG. 1, a discharging for a longer period of time can be attained as compared with the conventional fuel cell where only a small amount of fuel can be mixed with electrolyte. In addition, in case of using construction of a fuel cell which is divided into fuel cell part comprising pile of a number of unit cells and storage tank part for electrolyte and fuel and where a mixed solution of electrolyte and fuel is recycled to the cell by an external driving apparatus such as pump, the amount of solution to be recycled can be smaller as compared with the conventional fuel cell where proportion of fuel mixed with electrolyte is low and hence power required for driving apparatus for recycling can be made small and operation efficiency of the whole fuel cell is increased.

EXAMPLE 2

A method for producing a porous thin film layer inactive to fuel and electrolyte-resistant on the one surface of fuel electrode using an emulsion of fluorine resin powders having extremely small diameter is explained below.

In order to form a strong micro-porous thin film layer, an emulsion containing powders of extremely small diameter (fluorine resin) can be advantageously used. However, when said emulsion is applied to one surface of electrode substrate (porous sintered body of carbonyl nickel powders), the emulsion soaks into the whole electrode substrate and addition of catalyst of fuel electrode after formation of the micro-porous thin film layer on one surface of the electrode is prevented due to water repellency of fluorine resin. Therefore, firstly a mixture of fluorine resin powders and a metal oxide is applied to one surface of electrode substrate and is subjected to heat treatment to form a relatively rough thin film layer and then fluorine resin emulsion and metal oxide are further applied to said rough thin film layer and is again subjected to heat treatment. According to such method, fluorine resin emulsion does not diffuse into the whole electrode substrate and subsequent addition of catalyst is not prevented.

The following is a specific example of production of fuel electrode.

To one surface of a fuel electrode substrate as in Example 1 was applied a solution obtained by adding an alcohol (such as methyl alcohol, ethyl alcohol, etc.) to a mixture of 50 parts (by weight) of tetrafluoroethylene resin powders (average particle size about $1\mu$) and nickel oxide powders (average particle size about $1\mu$). Then, thus applied substrate was predried and then heat treated at 330°–370° C in an inert atomosphere to form a porous thin film layer (I) comprising fluorine resin and nickel oxide powders. The amount of layer (I) can be freely varied within the range of 5–20 mg/cm$^2$. To thus formed layer (I) was applied a mixed solution comprising 50 parts (by weight) of emulsion containing 7–10% of tetrafluoroethylene resin (average particle size of 0.2–0.4$\mu$) and 50 parts (by weight) of nickel oxide powders (average particle size of about $1\mu$). The applied solution was predried and heat treated at a temperature of 330°–370° C in an inert atmosphere to form porous thin film layer (II). The amount of layer (II) was advantageously within a range of 10–30 mg/cm$^2$.

After formation of layers (I) and (II), catalyst for fuel electrode which was the same as that of Example 1 was added to produce fuel electrode. Unit cell was constructed from two pieces of thus obtained fuel electrode and two pieces of air electrode mentioned in Example 1. A rough sectional view of the unit cell is shown in FIG. 3. In FIG. 3, 11 and 11 indicate air electrodes, 12 and 12 indicate fuel electrode and 16 and 16 indicate porous thin film layers comprising fluorine resin and nickel oxide formed on 12 and 12, respectively. Openings 17 and 17 for discharging gas are provided at the top of each of first chambers 14 and 14. 18 and 19 indicate an inlet and an outlet of electrolyte containing fuel provided at the second chamber 15. Lead from electrode, piping for entering and leaving of electrolyte containing fuel into and from cell, piping for discharging of gas, etc. are not shown. The construction is made liquid-tight so that only the electrolyte which has passed through electrodes 12 and 12 and porous thin film layers 16 and 16 is held in the chambers 14 and 14. 13 indicates a jar.

A mixed solution of 75 parts (by volume) of an aqueous solution of caustic potash having a specific gravity of 1.30 and 25 parts of hydrazine hydrate was supplied to the unit cell shown in FIG. 3 and discharge was effected at a current density of 50 mA/cm$^2$ to obtain a terminal voltage of 0.76–0.81 V. On the other hand, according to the conventional unit cell which has air electrodes and fuel electrode bodies which were the same as used in the above, but the porous thin film layers were not formed on the fuel electrode bodies, a terminal voltage of 0.74–0.76 V was obtained which was merely somewhat inferior to that of this Example. However, the utilization efficiency of fuel of the unit cell in this Example was higher than that of the conventional cell by about 30%.

EXAMPLE 3

Another method for formation of porous thin film layer on one surface of the fuel electrode substrate using metal oxide powders, fluorine resin powders and fluorine resin emulsion is shown below.

Firstly, layer (I) which is inactive to fuel and electrolyte-resistant was formed from metal oxide powders and fluorine resin powders and layer (II) was formed thereon from only fluorine resin emulsion. One specific example of such method is shown below.

To one surface of the fuel electrode substrate which was the same as used in Example 1 was applied a dispersion formed by dispersing in an alcohol (such as methyl alcohol, ethyl alcohol, etc.) a mixture of 90 parts (by weight) of nickel oxide powders (about $1\mu$ in average particle size) and 10 parts of tetrafluoroethylene powders (about $1\mu$ in average particle size). The applied dispersion was predried and then heat treated at a temperature of 330°–370° C in an inert atmosphere to form porous thin film layer (I). The amount of the layer (I) is preferably 5–50 mg/cm$^2$, more preferably 8–20 mg/cm$^2$, but the amount varies depending upon particle size of fluorine resin powders and nickel oxide powders and mixing ratio thereof.

Then, tetrafluoroethylene resin (0.2–0.4$\mu$ in average particle size) emulsion (a resin content of about 5–10%) was applied to the layer (I) and predried. Then the layer was heat treated at a temperature of 330°–370° C in an inert atmosphere to cause strong adhesion of fluorine resin. The amount of layer formed with said fluorine resin emulsion is preferably 0.5–7 mg/cm$^2$, especially 1–2.5 mg/cm$^2$. The amounts of the layers (I) and (II) vary depending upon current density for discharge of the cell and proportion of fuel added to electrolyte.

Unit cell as in Example 2 was constructed using two pieces of said fuel electrode. The relation between fuel concentration and cell voltage of the cells which comprises 18 unit cells in piled form and in which an aqueous solution of caustic potash having a specific gravity of 1.30 was used as an electrolyte and hydrazine hydrate was used as a fuel was as follows: (The cell used as a comparative example comprised 18 piled unit cell shown as the conventional cell in Example 2).

| (i) | Fuel concentration | | 30% by volume |
| --- | --- | --- | --- |
| | | Discharge at 40 mA/cm$^2$ | Discharge at 60 mA/cm$^2$ |
| | This Example | 15.5 V | 14.0 V |
| | Comparative Example | 14.4 V | 13.0 V |
| (ii) | Fuel concentration | | 40% by volume |
| | | Discharge at 40 mA/cm$^2$ | Discharge at 60 mA/cm$^2$ |
| | This Example | 14.9 V | 13.5 V |
| | Comparative Example | 13.2 V | 11.9 V |

When continuous discharge was effected at 60 mA/cm$^2$ with a fuel concentration of 30%, reduction in voltage after lapse of 8,000 hours was 6–8% of the voltage at initiation of discharge in the cell of this Example and 10–13% in the cell of the comparative Example. The cell of this Example was excellent in the life.

EXAMPLE 4

A method for providing a porous thin film layer comprising only the resin on one surface of a fuel electrode substrate is explained below.

To the fuel electrode substrate mentioned in Example 1 was added a catalyst for fuel electrode mentioned in Example 1, namely, an Ni-Cu system catalyst and metallic palladium. Then, to one surface of said electrode substrate was allowed to adhere with pressure a porous body (about 0.7 mm in thickness and about 60% in porosity) comprising a resin (e.g, vinyl chloride resin) which was inactive to fuel and electrolyte-resistant with a pressure of 70–150 kg/cm$^2$. A unit cell which was the same as shown in FIG. 1 was constructed using a piece of said fuel electrode and a piece of air electrode which was the same as used in Example 1. A mixed solution comprising 75% (by volume) of an aqueous solution of caustic potash having a specific gravity of 1.30 and 25% of hydrazine hydrate at initiation of discharge was used as a mixed solution of fuel and electrolyte.

Figure 4:
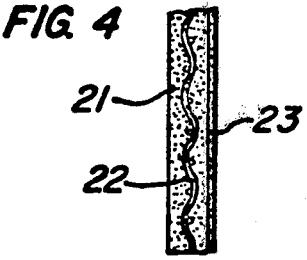
FIG. 4 shows a longitudinal section of a fuel electrode in the present fuel cell.

FIG. 4 shows cross sectional view of a fuel electrode, in which 21 is a porous body obtained by sintering carbonyl nickel powders, to which a catalyst necessary for electrochemical reaction of fuel electrode is added, 22 shows a nickel screen and 23 indicates a porous thin film layer which is inactive to fuel and electrolyte-resistant and which corresponds to the porous body made of vinyl chloride resin in Example 4.

Figure 5:
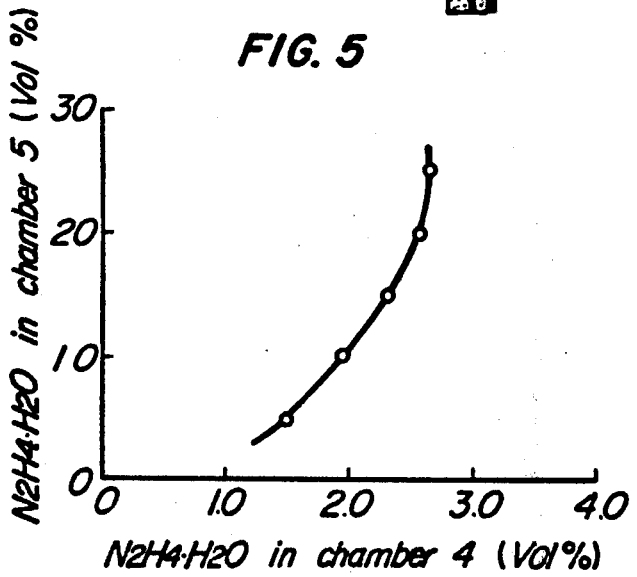
FIG. 5 is a graph which shows the relation between hydrazine hydrate contents in electrolytes in the first and the second chambers.

The cell shown in Example 4 was discharged at a current density of 50 mA/cm$^2$ to obtain a terminal voltage of 0.85–0.82 V and a utilization efficiency of fuel of 67–75%. Volumeric percentages of hydrazine hydrate contained in electrolyte in the cell are shown in FIG. 5. The ordinate and abscissa in FIG. 5 indicate content of hydrazine hydrate in chambers 5 and 4 of the cell shown in FIG. 1, respectively.

Thus, the effects obtained by Example 4 are the similar to those obtained in Examples 1–3, namely, a high terminal voltage and a high utilization efficiency of fuel are obtained even when hydrazine which is an active fuel is added to an electrolyte in a high concentration.

What is claimed is:

1. In a fuel in which electrochemical reaction is carried out by dissolving hydrazine fuel in an aqueous solution of caustic alkali as an electrolyte, the improvement in that the inside of a jar containing an oxidation electrode and a fuel electrode is divided into a first chamber and a second chamber by said fuel electrode, said oxidation electrode is provided in said first chamber so that it opposes said fuel electrode, a porous film which is inactive to fuel and electrolyte-resistant is provided to adhere to the surface of said fuel electrode which faces said second chamber, said fuel electrode allowing the electrolyte in which the fuel is dissolved to freely pass therethrough, said porous film produced by binding with a resin binder powders of a substance which is inactive to said fuel and electrolyte-resistant selected from the group consisting of nickel oxide, aluminum oxide, iron oxide, magnesium oxide and graphite whereby the fuel in the electrolyte which is introduced into said second chamber diffuses through said porous film and said fuel electrode to reach said first chamber.

2. A fuel cell according to claim 1, wherein the binder is fluorine resin powders.

3. A fuel cell according to claim 1, wherein the binder is fluorine resin emulsion.

4. A fuel cell according to claim 1, wherein the porous film comprises a layer made of fluorine resin powders and powders of a substance which is electrolyte-resistant and inactive to fuel and a layer made of fluorine resin emulsion and formed on the first layer.

5. A fuel cell according to claim 1, wherein inlet and outlet for electrolyte containing fuel are provided at the second chamber and the electrolyte containing fuel is continuously supplied from the outside of the cell.

6. A fuel cell according to claim 1, wherein said oxidation electrode is a gaseous oxidizing agent.

7. A method of operating a fuel cell in which an electrochemical reaction is carried out comprising supplying hydrazine fuel which is dissolved in an aqueous solution of caustic alkali an an electrolyte to a fuel cell comprising a jar containing an oxidizing electrode and a fuel electrode which is divided into a first chamber and a second chamber by said electrode, said oxidation electrode is provided in said first chamber so that it opposes said fuel electrode, a porous film which is inactive to fuel and electrolyte-resistant is provided to adhere to the surface of said fuel electrode which faces said second chamber, said fuel electrode allowing the electrolyte in which the fuel is dissolved to freely pass therethrough, said porous film produced by binding with a resin binder powders of a substance which is inactive to said fuel and electrolyte-resistant selected from the group consisting of nickel oxide, aluminum oxide, iron ioxide, magnesium oxide and graphite whereby the fuel in the electrolyte which is introduced into said second chamber diffuses through said porous film and said fuel electrode to reach said first chamber.

8. A method of operating a fuel cell according to claim 7, wherein the binder is fluorine resin powders.

9. A method of operating a fuel cell according to claim 7, wherein the binder is fluorine resin emulsion.

10. A method of operating a fuel cell according to claim 7, wherein the porous film comprises a layer made of fluorine resin powders and powders of a substance which is electrolyte-resistant and inactive to fuel and a layer made of fluorine resin emulsion and formed on the first layer.

11. A method of operating a fuel cell according to claim 7, wherein inlet and outlet for electrolyte containing fuel are provided at the second chamber and the electrolyte containing fuel is continuously supplied from the outside of the cell.

12. A method of operating a fuel cell according to claim 7, wherein said oxidation electrode is a gaseous oxidizing agent.

* * * * *